United States Patent Office 3,002,966
Patented Oct. 3, 1961

3,002,966
METHOD OF PRODUCING MANNOSE-6-PHOSPHATE
Morey E. Slodki, Peoria, Ill., assignor to the United States of America as represented by the Secretary of Agriculture
No Drawing. Filed Dec. 18, 1959, Ser. No. 860,614
3 Claims. (Cl. 260—234)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention pertains to a method of producing mannose-6-phosphate at much lower cost than has heretofore been possible.

Mannose-6-phosphate is a known compound having established utility as a substrate material in biochemical research.

In Patent No. 2,961,378 of Benedict, et al. it is disclosed that the potassium salts of phosphomannans, polysaccharide polymers comprising phosphorylated mannose units, may be produced by aerobic whole culture fermentations of certain strains of yeasts, namely *Hansenula holstii*, NRRL Y-2448, NRRL Y-2154, and NRRL Y-2155.

I have now discovered, according to the instant invention, that commercially attractive yields of mannose-6-phosphate can be obtained by heating the potassium salt of a phosphomannan polymer, such as one of those described above and including also the additional members described in Table I hereinafter, with hydrochloric acid, to hydrolyze mannose-6-phosphate therefrom. The pH of the hydrolysate is then adjusted to about 8.2 and barium acetate mixed therewith to form the barium salt of the mannose-6-phosphate. Methanol is added to the resulting mixture to precipitate the barium salt of mannose-6-phosphate which is separated from the methanol mixture. The separated barium salt of mannose-6-phosphate is then slurried with the free acid (H+) form of a sulfonic acid type cation exchange resin to remove the barium from said barium salt of mannose-6-phosphate and free the mannose-6-phosphate.

Thereafter, if desired, the mannose-6-phosphate may be converted to its potassium salt and recovered in the form of its potassium salt. Such conversion may be effected, for example, by filtering the aforementioned slurry of the barium salt of the mannose-6-phosphate with the free acid (H+) form of the sulfonic acid type cation exchange resin, after the removal of the barium from the barium salt of the mannose-6-phosphate and the consequent freeing of the mannose-6-phosphate, neutralizing the filtrate containing the freed mannose-6-phosphate and converting the mannose-6-phosphate to its potassium salt, and drying the neutralized filtrate to recover the mannose-6-phosphate in the form of its potassium salt. These steps leading to the production of the mannose-6-phosphate were unobvious prior to my discovery that the phosphorus in the above phosphomannans exists in the form of an acid-resistant sugar phosphate ester.

I have further discovered that there is a large variation in the molar ratio of mannose to phosphate in the polysaccharides produced by fermentations of the above and other organisms, as shown in Table I and that the yields of mannose-6-phosphate are inversely related thereto. For example, the indicated treatment of a 2-gram portion of the polymer obtained with *H. holstii*, NRRL Y-2448, yielded 221 mg. of mannose-6-phosphate whereas that from the same quantity of polymer obtained from a fermentation of *H. capsulata*, NRRL Y-1842 provided 532 mg. of mannose-6-phosphate.

TABLE I

| Organism | NRRL No. | Mannose-phosphorus ratio in polymer | Degree of polymerization (by end group analysis) |
|---|---|---|---|
| Hansenula capsulata | Y-1889 | 2.5 | 101 |
| Hansenula capsulata | Y-1842 | 2.5 | 244 |
| Hansenula holstii | Y-2154 | 5.2 | 600 |
| Hansenula holstii | Y-2448 | 5.7 | 588 |
| Hansenula minuta | Y-411 | 27.5 | 144 |
| Pachysolen tannophilus | Y-2461 | 4.2 | 256 |
| Torulopsis pinus | Y-2023 | 8.4 | 51 |
| Saccharomyces pini | YB-2022 | 12.2 | 51 |

This invention is to be clearly distinguished from that disclosed and claimed in my copending application, Serial No. 860,615, filed of even date, in which it is taught that the same potassium salts of the polysaccharide polymers herein employed as starting materials may be first treated with a cation exchange resin to convert the potassium salts of the polymers to the free acid forms thereof, and then heated to induce an auto-hydrolysis of pyrophosphate bonds and thus form the phosphoric acid monoesters of the mannose polymers, the said monoesters having marked utility as dispersing agents for high concentrations of substances such as zinc oxide, as are employed in dermatological preparations.

The following embodiment is set forth to further teach the practice of my invention.

*Example 1*

Phosphomannan, NRRL Y-1842, in the form of its potassium salt, was prepared by culturing 200 ml. of a freshly prepared subculture of *Hansenula capsulata*, NRRL Y-1842 for 96 hours at 25° C. under aerobic conditions (0.5 millmole $O_2$/L./min.) with 4000 ml. of a substrate having the following composition:

| Component: | Wt. by vol. percent |
|---|---|
| Comml. glucose | 6.0 |
| Corn steep liquor | 0.1 |
| Tryptone | 0.1 |
| $KH_2PO_4$ | 0.5 |
| Solution B (Speakman salts)[1] | 0.5 v./v. |
| Water | Q.S. |
| (Initial pH 5.0) | |

[1] J. Biol. Chem. 58, 395 (1923–1924).

Phosphomannan NRRL Y-1842 in the form of its potassium salt was recovered by supercentrifuging off the cells after adding 2100 ml. methanol, precipitating the impure potassium phosphomannan from the centrifugate by adding 30 ml. of saturated potassium acetate solution, redissolving the said phosphomannan salt in 6000 ml. of 50 percent aqueous methanol, recentrifuging to remove residual cells; reprecipitating the said phosphomannan salt by adding 40 ml. of said acetate solution; redissolving the precipitate in 1500 ml. distilled water, adding 900 ml. of methanol containing 5 percent potassium acetate (final methanol concentration of 37 percent); dehydrating the precipitated potassium phosphomannan in 600 ml. of methanol containing 1 percent potassium acetate; washing with absolute methanol; and drying in a vacuum oven at 45° C. for 8 hours; yield, 55 gms. of pure white powder.

Two grams of powdered potassium phosphomannan, NRRL Y-1842 obtained from a fermentation of *Hansenula capsulata*, NRRL Y-1842 as above was dissolved in 50 ml. of 2 N HCl and heated at 100° C. for 75 minutes. After decolorizing with activated charcoal, 20 ml. (0.25 ml./mg. P in the polymer sample) of 25 percent barium acetate solution was added and the pH adjusted to pH 8.2 with 10 N KOH. Two volumes of absolute methanol was added. The precipitated barium salt of mannose-6-phosphate obtained by by centrifugation was slurried with an excess of the free acid form of a sulfonic acid type cation exchange resin, and 532 mg. of pure mannose-6-phosphate as the potassium salt was obtained upon freeze drying of the neutralized filtrate.

Having fully disclosed my invention, I claim:

1. A process of preparing mannose-6-phosphate comprising heating the potassium salt of a phosphomannan polymer with hydrochloric acid to hydrolyze mannose-6-phosphate therefrom, said potassium salt of the phosphomannan polymer having been obtained from the aerobic whole culture fermentation of a yeast selected from the group consisting of Hansenula holstii NRRL Y–2448, Hansenula holstii NRRL Y–2154, Hansenula holstii NRRL Y–2155, Hansenula capsulata NRRL Y–1889, Hansenula capsulata NRRL Y–1842, Hansenula minuta NRRL Y–411, Pachysolen tannophilus NRRL Y–2461, Torulopsis pinus NRRL Y–2023, and Saccharomyces pini NRRL YB–2022, adjusting the pH of the hydrolysate to about 8.2 and mixing therewith barium acetate to form the barium salt of the mannose-6-phosphate, adding methanol to the resulting mixture to precipitate the barium salt of mannose-6-phosphate, separating the precipitated barium salt of mannose-6-phosphate from the methanol mixture, and slurrying the separated barium salt of mannose-6-phosphate with the free acid form of a sulfonic acid type cation exchange resin to remove the barium from said barium salt of mannose-6-phosphate and free the mannose-6-phosphate.

2. A process of preparing mannose-6-phosphate comprising heating the potassium salt of a phosphomannan polymer with hydrochloric acid to hydrolyze mannose-6-phosphate therefrom, said potassium salt of the phosphomannan polymer having been obtained from the aerobic whole culture fermentation of a yeast selected from the group consisting of Hansenula holstii NRRL Y–2448, Hansenula holstii NRRL Y–2154, Hansenula holstii NRRL Y–2155, Hansenula capsulata NRRL Y–1889, Hansenula capsulata NRRL Y–1842, Hansenula minuta NRRL Y–411, Pachysolen tannophilus NRRL Y–2461, Torulopsis pinus NRRL Y–2023, and Saccharomyces pini NRRL YB–2022, adjusting the pH of the hydrolysate to about 8.2 and mixing therewith barium acetate to form the barium salt of the mannose-6-phosphate, adding methanol to the resulting mixture to precipitate the barium salt of mannose-6-phosphate, separating the precipitated barium salt of mannose-6-phosphate from the methanol mixture, slurrying the separated barium salt of mannose-6-phosphate with the free acid form of a sulfonic acid type cation exchange resin to remove the barium from said barium salt of mannose-6-phosphate and free the mannose-6-phosphate, converting the mannose-6-phosphate to its potassium salt, and recovering the mannose-6-phosphate in the form of its potassium salt.

3. A process of preparing mannose-6-phosphate comprising heating the potassium salt of a phosphomannan polymer with hydrochloric acid to hydrolyze mannose-6-phosphate therefrom, said potassium salt of the phosphomannan polymer having been obtained from the aerobic whole culture fermentation of a yeast selected from the group consisting of Hansenula holstii NRRL Y–2448, Hansenula holstii NRRL Y–2154, Hansenula holstii NRRL Y–2155, Hansenula capsulata NRRL Y–1889, Hansenula capsulata NRRL Y–1842, Hansenula minuta NRRL Y–411, Pachysolen tannophilus NRRL Y–2461, Torulopsis pinus NRRL Y–2023, and Saccharomyces pini NRRL YB–2022, adjusting the pH of the hydrolysate to about 8.2 and mixing therewith barium acetate to form the barium salt of the mannose-6-phosphate, adding methanol to the resulting mixture to precipitate the barium salt of mannose-6-phosphate, separating the precipitated barium salt of mannose-6-phosphate from the methanol mixture, slurrying the separated barium salt of mannose-6-phosphate with the free acid form of a sulfonic acid type cation exchange resin to remove the barium from said barium salt of mannose-6-phosphate and free the mannose-6-phosphate, filtering the slurry, neutralizing the filtrate containing the freed mannose-6-phosphate and converting the mannose-6-phosphate to its potassium salt, and recovering the mannose-6-phosphate in the form of its potassium salt.

References Cited in the file of this patent

UNITED STATES PATENTS

| | | |
|---|---|---|
| 1,129,321 | Von Euler-Chelpin | Feb. 23, 1915 |
| 2,024,036 | Funaoka | Dec. 10, 1935 |
| 2,052,029 | Harris | Aug. 25, 1936 |
| 2,746,889 | Langlois et al. | May 22, 1956 |

FOREIGN PATENTS

| | | |
|---|---|---|
| 11,653 | Great Britain | of 1913 |

OTHER REFERENCES

Chemical Abstracts, vol. 48, 1954, p. 11356a.
Chemical Abstracts, vol. 50, 1956, p. 7186c.